United States Patent
Han

(10) Patent No.: US 8,850,692 B2
(45) Date of Patent: Oct. 7, 2014

(54) 3-DIMENSION FIBER STRUCTURES FOR COMPOSITES AND INTERFACES

(76) Inventor: Nanlin Han, Valencia, CA (US)

(*) Notice: Subject to any disclaimer, the term of this patent is extended or adjusted under 35 U.S.C. 154(b) by 685 days.

(21) Appl. No.: 12/870,580

(22) Filed: Aug. 27, 2010

(65) Prior Publication Data
US 2011/0209595 A1 Sep. 1, 2011

Related U.S. Application Data

(60) Provisional application No. 61/275,397, filed on Aug. 28, 2009.

(51) Int. Cl.
*B26D 1/12* (2006.01)
*B32B 3/06* (2006.01)
*B26D 1/00* (2006.01)

(52) U.S. Cl.
CPC ...... *B26D 1/0006* (2013.01); *B26D 2001/0026* (2013.01); *B26D 2001/0046* (2013.01)
USPC .................................. 29/700; 7/170

(58) Field of Classification Search
CPC .......... B26D 1/0006; B26D 2001/026; B26D 2001/0046
USPC .................................. 29/700; 7/170
See application file for complete search history.

(56) References Cited

U.S. PATENT DOCUMENTS

| 4,622,253 A | 11/1986 | Levy |
| 4,759,812 A | 7/1988 | Miller |
| 4,858,811 A * | 8/1989 | Brosius et al. ............... 227/10 |
| 4,888,228 A | 12/1989 | Sidles |
| 5,143,569 A | 9/1992 | Gotoh et al. |
| 5,736,222 A | 4/1998 | Childress |
| 6,265,333 B1 | 7/2001 | Dzenis et al. |
| 6,301,755 B1 | 10/2001 | Gaber |
| 6,645,610 B1 | 11/2003 | Reis et al. |
| 6,701,580 B1 | 3/2004 | Bandyopadhyay |
| 7,018,496 B1 | 3/2006 | George et al. |
| 2004/0067342 A1 | 4/2004 | Shepard et al. |
| 2005/0196630 A1 | 9/2005 | Carper et al. |
| 2008/0193709 A1 | 8/2008 | Han |

OTHER PUBLICATIONS

L.Tong, A.P. Mouritz and M.K. Bannister, 3D Fiber Reinforced Polymer Composites, Elsevier Science Ltd, 2002, Kidlington, Oxford, OX5 1GB, UK.

Nanlin Han and Lin Sun, 3 Dimensional Fiber Structures for Composites, 3D Nanocomposites, Inc. 27653 Woodfield Pl, Valencia, California 91355, USA, Copyright 2006, Published by Society for the Advancement of Material and Process Engineering with permission.

* cited by examiner

*Primary Examiner* — Brent O'Hern
(74) *Attorney, Agent, or Firm* — WPAT, P.C.; Anthony King

(57) ABSTRACT

A sheet article, the sheet article including a substrate, a plurality of fasteners on at least a portion of one surface of the substrate, and a cover, at least partially covering the plurality of fasteners, wherein the cover at least partially protects the plurality of fasteners and prevents the plurality of fasteners from engaging other fasteners or pressing down and wherein the covered fasteners can be exposed or the cover can be removed if need.

21 Claims, 13 Drawing Sheets

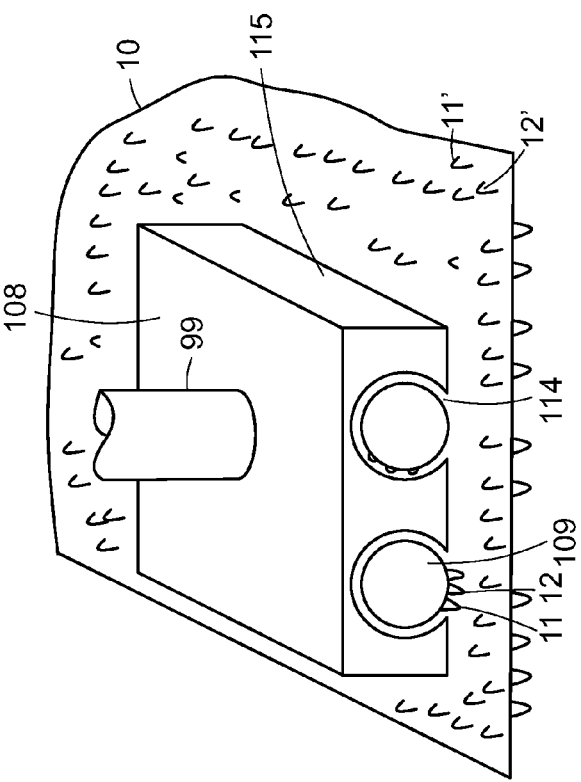

3-DIMENSION FIBER STRUCTURES FOR COMPOSITES AND INTERFACES

CROSS-REFERENCE TO RELATED APPLICATIONS

This application claims the benefit of U.S. Provisional Application No. 61/275,397, filed on Aug. 28, 2009, which is incorporated by reference herein in its entirety.

FIELD OF THE INVENTION

The subject invention relates to the art of composite materials, and more particularly, to 3-Dimension fiber structures for composites and interfaces.

BACKGROUND OF THE INVENTION

Fiber composite materials have been used in a wide range of industries (e.g., aerospace, aviation, automobile, ship, construction, sports equipments, etc.) for several decades. Fiber composite materials are generally manufactured through a process where fiber products are laid up filament by filament, ply by ply, and layer by layer, then bonded together using materials, such as plastics, rubber, metal, or other non-metal materials. A connection interface exists between two filaments/plies/layers. Fiber composite materials are usually weak at connection interfaces or inter-laminate area. For example, tensile strength of fibers within a ply can be higher than 3000 MPa (Mega Pascal), much higher than that of common steel; but interface or inter-laminate strength of fiber composite materials is usually about 100 MPa, even lower than that of Aluminum. Thus, the interface or inter-laminate strength of fiber composite materials is only about 1/30 of the tensile strength of fiber themselves.

It is generally difficult and expensive to increase the interface or inter-laminate strength of the filer composite materials by using a stronger bonding material (e.g., adhesives, plastics, or resin, etc.). The lower interface or inter-laminate interface strength of composites often leads to structural failures, such as de-lamination and de-bonding, under conditions, such as stress, impact, or fatigue. Therefore, adoption of fiber composite materials, especially in load-bearing structures, has been limited by their susceptibility to out-of-plane failures caused by low interface or inter-laminate strength. To alleviate these problems, methods of trans-laminate and cross-interface reinforcements, such as 3-D stitching, 3-D weaving, 3-D knitting, or 3-D braiding, have been used to improve de-lamination resistance and enhance interface strength. These 3-D reinforcement techniques, however, demand sophisticated equipments and require complicated manufacturing processes, and therefore, prolong the manufacture process, drive up the manufacture cost, and lower the manufacture productivity.

SUMMARY OF THE INVENTION

In general, in an aspect, the invention provides a sheet article, the sheet article including a substrate, a plurality of fasteners on at least a portion of one surface of the substrate, and a cover, at least partially covering the plurality of fasteners, wherein the cover at least partially protects the plurality of fasteners and prevents the plurality of fasteners from engaging other fasteners or pressing down and wherein the covered fasteners can be exposed and the cover can be removed if needed.

Implementations of the invention may provide one or more of the following features. The plurality of fasteners are selected from a group comprising of hooks, loops, anchor-shape hooks, fish hooks, forks, big heads, arrow-shape hooks, group loops, and group hooks. The cover includes a second substrate, a plurality of upstanding or protruding studs or walls on the second substrate, wherein the plurality of upstanding or protruding studs or walls protect a plurality of fasteners on an adjacent sheet. The hook or loop shape hook is stiffened to a certain level so that it can engage with other hook or loop fasteners on other sheet articles. In order to stack up the sheet articles, the covers are only on the designed parts of the designed sheet (e.g., a designed part on the surface sheet), laid up at least three plies of the sheet articles to form a 3D composite, wherein all plies may be fastened by the engaged fasteners on the piles, wherein matrix material is used to bond the at least three plies, wherein surface side may or may not have fasteners, wherein surface side may or may not have covers at the designed part. The sheet article is impregnated with one or more matrix materials selected from the group of polymer, resin, metal, ceramic, carbon, or glass to obtain a prepreg sheet, laid up at least two said prepreg plies to get a 3D composite, wherein only surface side may or may not have covers at the designed part.

Implementations of the invention may also provide one or more of the following features. In order to increase the bonding strength of two articles, the cover is removed; insert the sheet article to the interface area of two articles when bonding the two articles, wherein the fasteners on the sheet article will extend into the bodies of two bonding articles to increase interface strength, wherein the fasteners on the sheet article will interlock with the fasteners of two bonding articles if they have fasteners themselves. The substrate is made of plurality of fiber sheet plied contiguously, wherein the plurality fiber sheet are mechanically fastened together. The fibers in the same sheet can be lined up at the same direction or at different directions forming a multi-layer, multi-axis sheet. In order to stack up the sheet articles, the covers are only on the designed parts of the designed sheet (e.g., a designed part on the surface sheet), laid up at least two plies of the sheet articles to form a 3D composite, wherein all plies may be connected and supported by the fasteners on said piles, wherein matrix material infiltrates at least partial of the plies and fasteners, wherein said plies are not fully touched and there are hollow spaces between plies, wherein surface side may or may not have fasteners, wherein surface side may or may not have covers at the designed part. The sheet articles have gap between two sheet articles to fit pins of fiber sheet handling tool, wherein pins can grab and separate the sheet article. The fasteners can lean with acute angle at desired location and direction. The substrates have matrix material at inner walls of openings, wherein fasteners can be aligned through openings.

In general, in another aspect, the invention provides a method of using fastener cover on a sheet, including the steps of applying a covering material to at least one fastener on the sheet to protect the at least one fastener and removing the cover material during a bonding process to expose the at least one fastener.

Implementations of the invention may provide one or more of the following features. The method further includes the step of applying a sizing or a coating material to coat the at least one fastener.

In general, in yet another aspect, the invention provides a tool for handling a sheet with fasteners, including a base, a connector, capable of being coupled to a driving force, a housing unit in the base, a moving element, positioned at least partially within the housing unit and coupled to the driving force, and a plurality of fasteners on at least a portion of one surface of the moving element.

Implementations of the invention may provide one or more of the following features. The moving element can be fully hidden in the housing unit in the base and can extend out of the housing unit. A plurality of fasteners exist on at least a portion of one surface of the base if they are not on the moving element.

In general, in still another aspect, the invention provides a tire or cutting wheel, including a plurality of sheets and a plurality of fasteners on at least one of the plurality of sheets, wherein the plurality of fasteners on adjacent sheets are interlocked.

Implementations of the invention may provide one or more of the following features. The plurality of fasteners in the cutting wheel withhold particles against wearing during cutting.

These and other capabilities of the invention, along with the invention itself, will be more fully understood after a review of the following figures, detailed description, and claims.

BRIEF DESCRIPTION OF THE FIGURES

FIG. 15A illustrates an exemplary fiber-sheet handling tool.

FIG. 15B illustrates another exemplary fiber-sheet handling tool.

FIG. 15C illustrates yet another exemplary fiber-sheet handling tool.

DETAILED DESCRIPTION

Embodiments of the invention provide apparatuses and methods for improving inter-laminate and interface strength of composites. Trans-laminate and cross-interface reinforcements, such as fasteners, on the fiber sheets are configured to engage and interlock to provide trans-laminate and cross-interface reinforcement. These techniques utilize traditional textile industry technologies, non-weaving technologies, and hook and loop (e.g., Velcro) technologies, and are compatible with traditional low cost 2-D manufacturing process. The trans-laminate and cross-interface reinforcements help to increase impact and wearing resistance, improve thermal and/or electrical conductivity, enhance fatigue durability, extend usage life, advance manufacturability of composites, and expand applications of composite.

Figure 1:
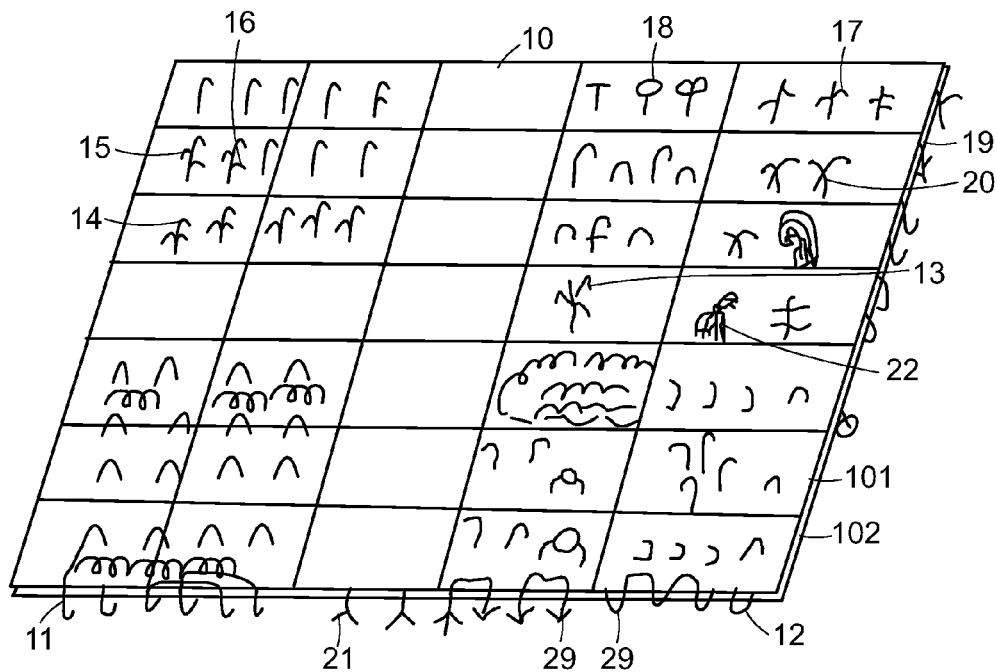
FIG. 1 illustrates an exemplary sheet of fibers or substrate with fasteners on its both sides.

Referring now to FIG. 1, an exemplary sheet of fibers or substrate 10 has fasteners 29 on both sides of the sheet or substrate. The fasteners can be in the form of hooks 11, loops 12, anchor-shape hooks 13, fish hooks 14, forks 17 and 21, big heads 18, arrow-shape hooks 19, group loops 20, or group hooks 15 and 16. The group hooks 15 or 16 can include multiple hooks to form chains of hook strings. The hooks 11, 13, 14, 15, 16, or 19 can include multiple threads 22 in different lengths. The fasteners 29 can form a pattern. One example of patterns is an array on the sheet or substrate 10 with specified directions. The fasteners 29 can also be randomly scattered or mixed on the sheet or substrate 10. The sheet or the substrate 10 can include multiple plies 101 and 102. The terms "ply" and "sheet" can be used to describe different physical structures, including but not limited to, thread, filament, strand, yarn, layer, or multiple plies formed as one ply/sheet.

Figure 2:
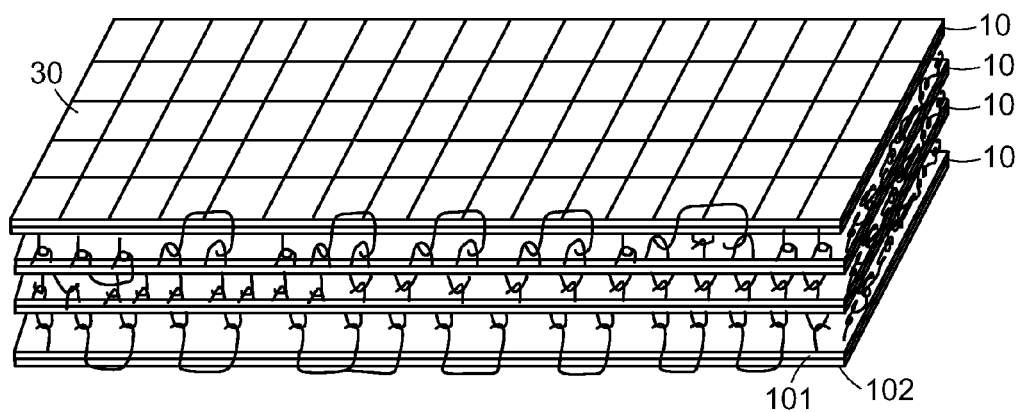
FIG. 2 illustrates an exemplary composite made of fiber sheets with fasteners.

As illustrated in FIG. 2, several sheets or substrates 10 are laid together layer-by layer to form a composite preform 30. The fasteners (e.g., hooks and loops) can be configured to engage each other to provide trans-layer, inter-layer, and interface reinforcements. The trans-layer fasteners make composite preform 30 a 3-D composite. Preferably, the top sheet and the bottom sheet have fasteners only on the inner side (i.e., the side facing an adjacent sheet) of the sheets. As discussed above, the sheet or the substrate 10 can include multiple plies 101 and 102.

Figure 3:
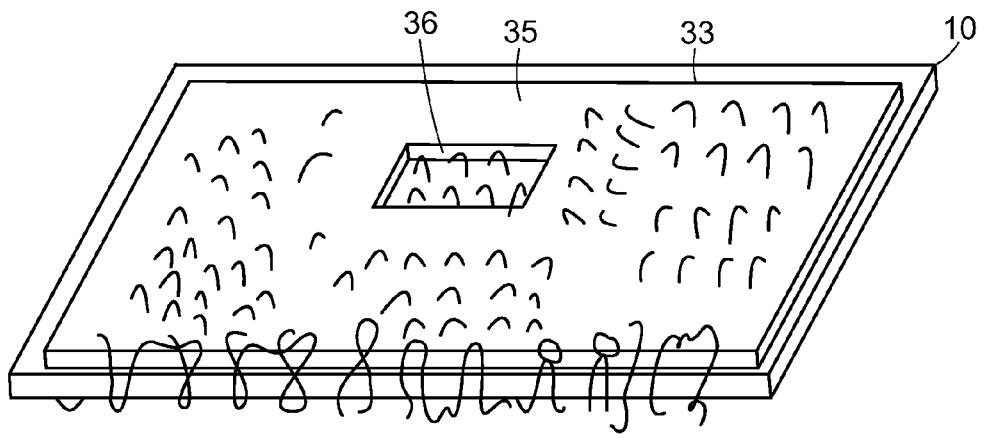
FIG. 3 illustrates an exemplary 3-D prepreg sheet with fasteners on its both sides.
Figure 4:
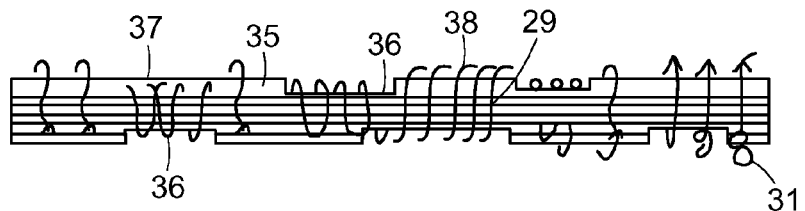
FIG. 4 shows a cross-section view of the 3-D prepreg sheet of FIG. 3.

In one embodiment, the multiple-ply sheet 10 is a sheet of prepreg infiltrated with a polymer matrix (e.g., epoxy or resin). FIG. 3 illustrates that the polymer matrix 35 infiltrates the sheet 10 to form a piece of prepreg 33. FIG. 4 shows a cross-section view of prepreg 33 with fasteners 31, 37, and 38. A portion of fasteners 31, 37, and 38 can be at least partially above the polymer matrix 35; other fasteners can be completely under the surface of the polymer matrix 35. The polymer matrix 35 covers at least some of the fasteners and helps to protect those fasteners and prevent them from engaging other fasteners on an adjacent sheet. Preferably, the polymer matrix 35 can have at least one indented portion 36 which is lower than its surrounding area. The indented portions 36 can be created by means such as cutting or molding. The indented portion 36 further helps to protect the fasteners 31, 37, and 38 and prevent them from engaging other fasteners on an adjacent sheet. The fasteners covered or protected by the polymer matrix 35 can be exposed when the polymer matrix 35 becomes liquid and flows away during the curing process.

Figure 5:
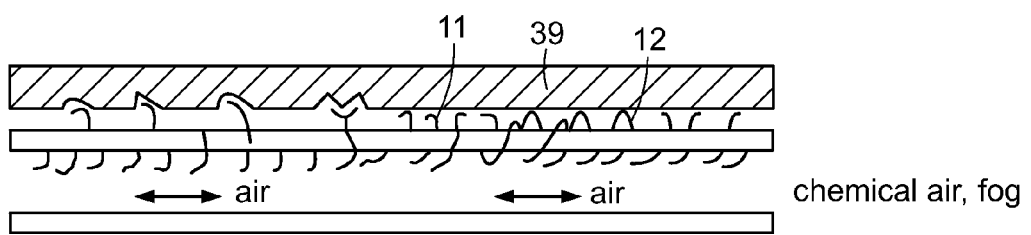
FIG. 5 illustrates an exemplary method of generating fasteners.

FIG. 5 illustrates some methods of generating fasteners 11 and 12. In one embodiment, a mold or heat iron 39 is configured to press the sheet to form fasteners (e.g., hooks and loops) 11 and 12 of certain shapes, angles, directions, and dimensions. In another embodiment, certain chemical gas or vapor is configured to flow through the sheet surface to form fasteners (e.g., hooks and loops) 11 and 12 of certain shapes, angles, directions, and dimensions. Alternatively, the fasteners 11 and 12 can be bonded on, glued on, weld on, compressed on, wrapped on, attached to, disposed on, embedded in, or grown on the sheet or ply. In addition, fasteners can be placed on sheets by air or water jet shoot. A combination of multiple generating methods described herein can also be used.

Fiber sheets can be made by existing textile industry technologies such as weaving, knitting, wrapping, braiding, stitching, and hook and loop (Velcro®) technologies, or non-weaving technologies (e.g., molding, coating, or needle penetrating). Velcro® loops are generally made by weaving or knitting. Velcro® loops are cut at the desired locations to form Velcro® hooks. Cutting can be achieved by knives, scissors, or other physical, chemical, and mechanical means. For example, laser can be used to cut loops to form hooks.

Figure 6A:
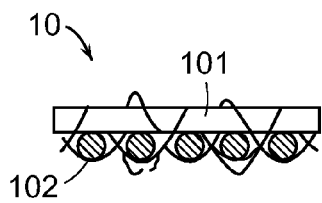
FIG. 6A shows a cross-section view of another exemplary sheet.
Figure 6B:
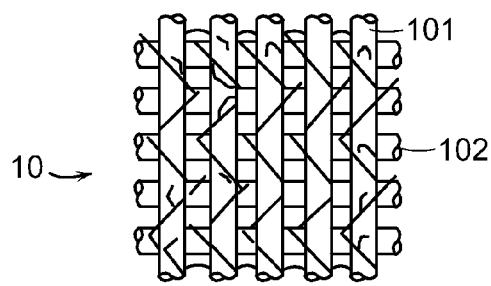
FIG. 6B shows a top view of the sheet in FIG. 6A.

FIG. 6A shows a cross-section view of another exemplary sheet 10. Sheet 10 is made of at least two layers of fibers 101 and 102. Each fiber layer can optionally have trans-layer fasteners (e.g., hooks and loops). The at least two layers 101 and 102 can be fastened together by weaving, knitting, and/or stitching. The top view of sheet 10 is shown in FIG. 6B.

Figure 7A:
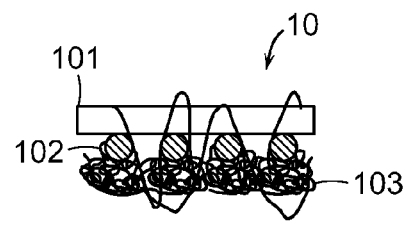
FIG. 7A shows a cross-section view of another exemplary sheet with a fiber mat as an additional layer.
Figure 7B:
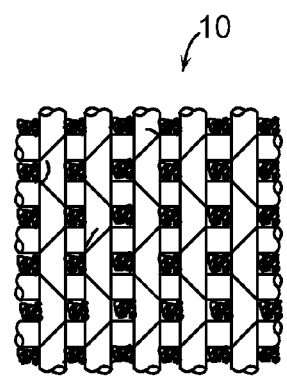
FIG. 7B shows a top view of the sheet in FIG. 7A.

FIG. 7A shows a cross-section view of yet another exemplary sheet 10. Sheet 10 is made of at least two layers of fibers 101 and 102. Each fiber layer can optionally have trans-layer fasteners (e.g., hooks and loops). Sheet 10 can optionally have a fiber mat or a substrate 103 as an additional layer. The fiber mat or substrate 103 can be placed outside the two layers of fibers 101 and 102; alternatively, it can be sandwiched between two layers of fibers 101 and 102. The at least two layers 101 and 102 and the optional fiber mat or substrate layer 103 can be fastened together by weaving, knitting and/or stitching. The top view of sheet 10 is showed in FIG. 7B.

Figure 9A:
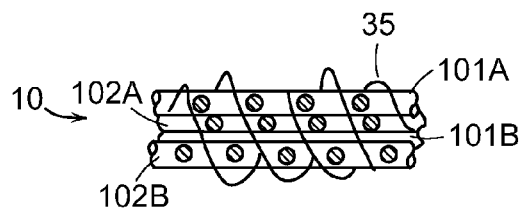
FIG. 9A shows a cross-section view of an exemplary multi-layer multi-axis prepreg sheet with a matrix material.
Figure 8:
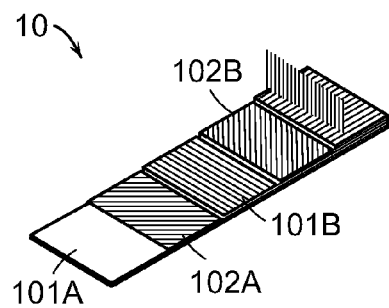
FIG. 8 illustrates an exemplary multi-layer multi-axis sheet.
Figure 9B:
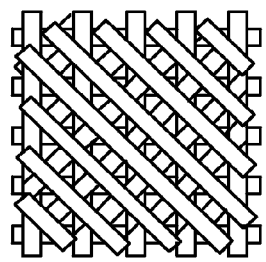
FIG. 9B shows a top view of the multi-axial prepreg sheet of FIG. 9A.

FIG. 8 illustrates an exemplary multi-layer multi-axis sheet 10. Sheet 10 is made of multiple layers of fibers 101A, 101B, 102A, and 102B. Each fiber layer can optionally have trans-layer fasteners (e.g., hooks and loops). Fibers in the same layer are approximately lined up in the same direction or axis. Fibers in different layers can be lined up to different directions or axes, forming a multi-layer, multi-axis sheet, as shown in FIGS. 8, 9A, and 9B. The multiple layers 101A, 101B, 102A, and 102B can be bonded together by weaving, knitting, and/or stitching. Sheet 10 can optionally have a matrix material 35 flowed into it to form a prepreg, as shown in FIG. 9A.

Figure 10A:
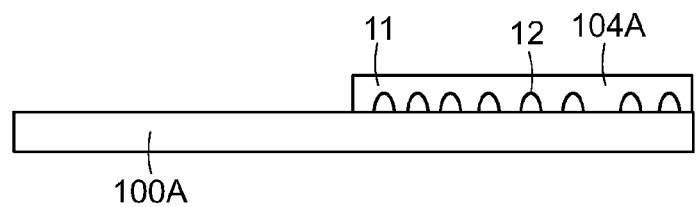
FIG. 10A shows a cross-section view of a first article with fasteners and a cover.
Figure 10B:
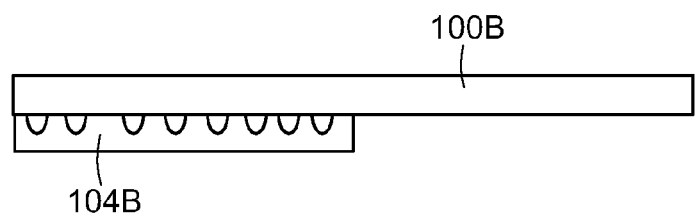
FIG. 10B shows a cross-section view of a second article with fasteners and a cover.

In many situations two or more composite structures need to be connected or bonded. Fasteners at the connection area help to improve the connection strength. FIG. 10A shows a cross-section view of a first article 100A with fasteners 11 and 12 and a first cover 104A covering at least a portion of the first article. The first article 100A can be a single-layer or multi-layer fiber sheet, a composite part, or a substrate. FIG. 10B shows a cross-section view of a second article 100B with fasteners and a second cover 104B covering at least a portion of the second article. The second article 100B can also be a single-layer or multi-layer fiber sheet, a composite part, or a substrate. The covers 104A and 104B help to protect the covered fasteners 11 and 12 and prevent them from pressing down, engaging, and interlocking each other during production processes, such as curing and molding.

The covers 104A and 104B can be made of materials, such as paper, silicone, rubber, polymer, metal wax, paste, powder, etc. The covers can also be made of mixtures of the aforementioned materials. In one embodiment, a low melting-point alloy suitable for room temperature curing processes is used to cover the fasteners. One example of such an alloy is a eutectic alloy, made of about 50% bismuth, about 26.7% lead, about 13.3% tin, and about 10% cadmium by weight, and with a melting point of approximately 70° C. (158° F.). During the curing process, the covers can be removed by heat and the covered fasteners can then be exposed. In another embodiment, wax and RTV silicone are used to cover the fasteners. At first, wax is applied as sizing to coat the fasteners, in order to achieve a relatively smooth surface. Then RTV silicone is used to cover the fasteners. During the curing process, RTV silicone cover can be peeled away or be removed by heat or chemical solutions; wax coating can be removed by heat or by chemical solutions.

Figure 11A:
FIG. 11A shows a cross-section view of the first article of FIG. 10A with the cover removed.
Figure 11B:
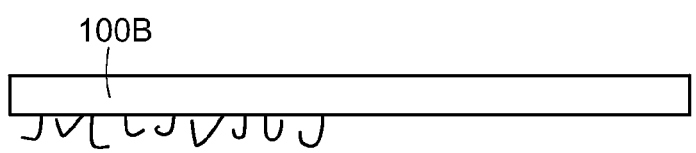
FIG. 11B shows a cross-section view of the second article of FIG. 10B with the cover removed.
Figure 12:
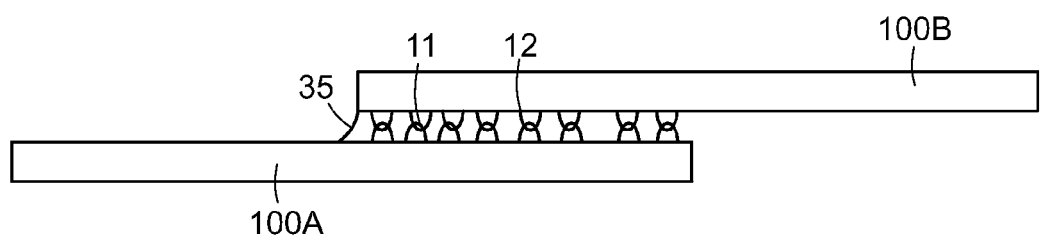
FIG. 12 shows a cross-section view of the two fiber articles of FIGS. 11A and 11B interlocked together by the fasteners on both fiber sheets.

When the two articles 100A and 100B are ready to be connected, the covers 104A and 104B can be removed by mechanical, physical and/or chemical means to expose the fasteners, as shown in FIGS. 11A and 11B. The fasteners 11 and 12 on articles 100A and 100B are then engaged and interlocked together to form a connection/bonding between the first article 100A and the second article 100B, as shown in FIG. 12. The connected articles can optionally have a matrix material 35 incorporated at the connection area for at least one subsequent curing process.

Figure 13A:
FIG. 13A shows a cross-section view of a first article without fasteners.
Figure 13B:
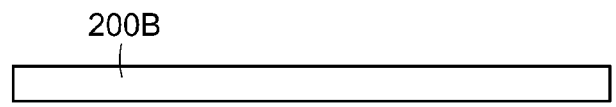
FIG. 13B shows a cross-section view of a second article without fasteners.
Figure 13C:
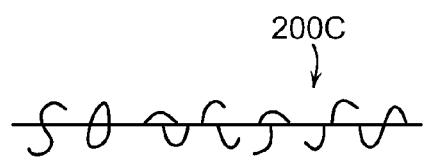
FIG. 13C shows a cross-section view of an exemplary fiber sheet with fasteners on both sides.
Figure 13D:
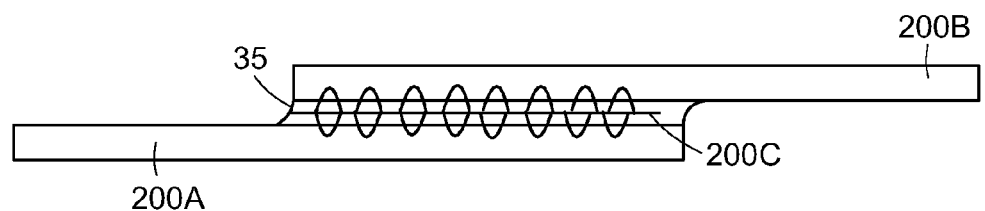
FIG. 13D shows a cross-section view of the two articles of FIGS. 13A and 13B interlocked together by the fasteners of the fiber sheet of FIG. 13C.
Figure 13E:
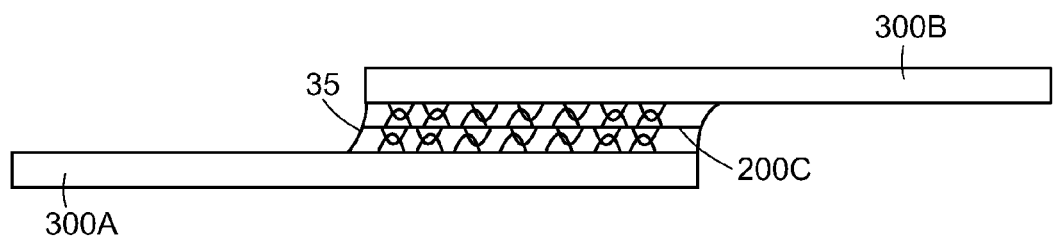
FIG. 13E shows a cross-section of view of two articles with fasteners interlocked together using the fiber sheet of FIG. 13C.

FIG. 13A shows a cross-section view of a first article 200A without any fastener. The first article 200A can be a single-layer or multi-layer fiber sheet, a composite part, or a substrate. FIG. 13B shows a cross-section view of a second article 200B without any fastener. The second article 200B can also be a single-layer or multi-layer fiber sheet, a composite part, or a substrate. FIG. 13C shows a cross-section view of an exemplary fiber sheet 200C with fasteners on both sides. The fiber sheet 200C can be sandwiched between two articles 200A and 200B at the connection area, as shown in FIG. 13D. The fasteners on the fiber sheet 200C can lock onto the articles 200A and 200B and thus help to improve the connection strength of articles 200A and 200B. Alternatively, as shown in FIG. 13E, two articles to be connected 300A and 300B can have their own fasteners at the connection area. The fiber sheet 200C can still be sandwiched between two articles 300A and 300B at the connection area. The fasteners on the fiber sheet 200C can engage and interlock with the fasteners on articles 300A and 300B and thus help to improve the connection strength of articles 300A and 300B. The connected articles can optionally have matrix material 35 incorporated at the connection area for at least one subsequent curing process.

Figure 14A:
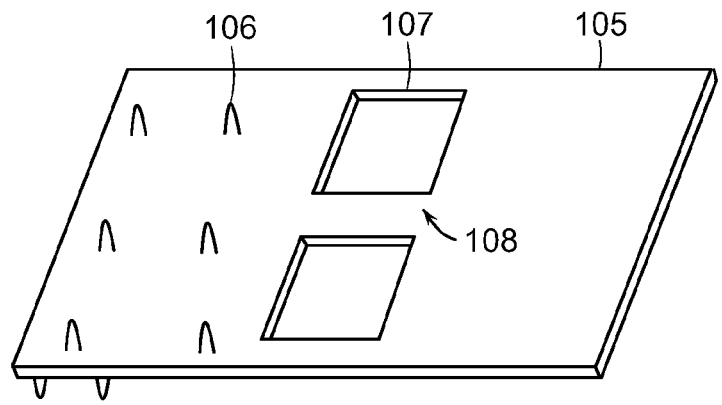
FIG. 14A illustrates a sheet with extension studs and windows.
Figure 14B:
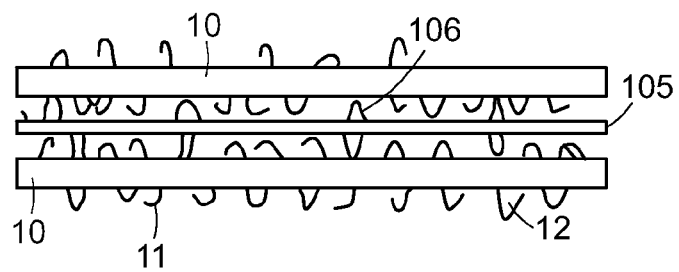
FIG. 14B shows a cross-section view of the sheet of FIG. 14A being placed between two sheets with fasteners.
Figure 14C:
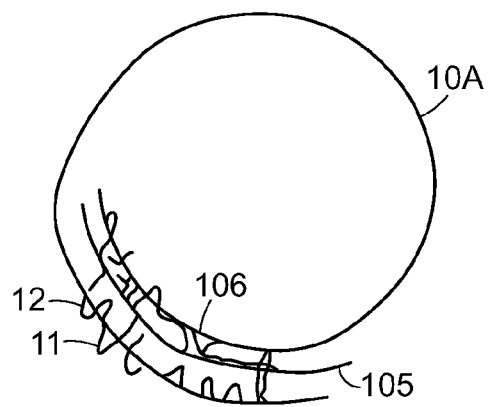
FIG. 14C shows a cross-section view of the sheet of FIG. 14A being placed within a roll of sheets with fasteners.

Referring now to FIG. 14A, a sheet 105 can have upstanding or protruding studs 106, windows 107, and/or walls 108. The sheet 105 can be made of paper, plastic, or other materials by press molding, injection molding, and/or other means. The upstanding or protruding studs 106 and walls 108 can be mounted or welded on to the sheet 105. The upstanding or protruding studs 106 walls 108 can also be generated on the sheet 105 by means such as press molding. The windows 107 can be created by means such as cutting or molding. The sheet 105 can be placed between two sheets with fasteners 10, as shown in FIG. 14B. The upstanding or protruding studs 106, walls 108, and windows 107 help to create spaces between two sheets 10 and protect the fasteners 11 and 12 during production and transportation process, such as layering and rolling. FIG. 14C illustrates that the sheet 105 with upstanding or protruding studs 106, walls 108, and windows 107 separates and protects fasteners 11 and 12 in a sheet roll 10A.

Automatic handling of fiber sheets has been and is still a big challenge in the composite industry. In many situations, the task of lying up fiber sheet is still performed manually, i.e. by hand, mostly due to the lack of effective tools. The present invention describes fiber-sheet handling tools that can be configured to be driven by manual, electrical, hydraulic, magnetic, and/or mechanical forces. One embodiment of a fiber-sheet handling tool 108 according to the present invention is shown in FIG. 15A. Fiber-sheet handling tool 108 includes a base 115 and a connector 99. The connector 99 is capable of being coupled to a control signal and/or a manual, electrical, hydraulic, magnetic, and/or mechanical driving force. The tool 108 has at least one rod 109 that is positioned within a housing unit 114. The rod 109 has a first plurality of fasteners 11 and 12 on some portion of its surface. The rod 109 is rotatable by manual, electrical, hydraulic, magnetic, and/or mechanical driving force. In operation, the tool 108 is positioned adjacent to the sheet 10 with a second plurality of fasteners 11' and 12'. When the rod 109 is rotated to expose its first plurality of fasteners 11 and 12, the fasteners 11 and 12 engage and interlock with the second plurality of fasteners 11' and 12' on the sheet 10. The engagement and interlocking of fasteners allows the tool 108 to grab the sheet 10. When the rod 109 is rotated to hide its first plurality of fasteners 11 and 12, the fasteners 11 and 12 disengage and unlock from the second plurality of fasteners 11' and 12' of the sheet 10. The disengagement and unlocking of fasteners allows the tool 108 to release the sheet 10.

Another embodiment of a fiber-sheet handling tool 108' according to the present invention is shown in FIG. 15B. Fiber-sheet handling tool 108' includes a base 115' and a connector 99'. The base 115' has a first plurality of fasteners 11 and 12 on at least some portion of its bottom contact surface. The connector 99' is capable of being coupled to a control signal and/or a manual, electrical, hydraulic, magnetic, and/or mechanical driving force. The base 115' can also optionally have an axis 111 to further couple to an additional driving force. The tool 108' has at least one bar 110 that is positioned within a housing unit 114'. The bar 110 is retractable by manual, electrical, hydraulic, magnetic, and/or mechanical driving force. In operation, the tool 108' is positioned adjacent to the sheet 10 with a second plurality of fasteners 11' and 12'. When the bar 110 is retracted to recess within the housing unit 114', the first plurality of fasteners 11 and 12 of the bottom contact surface of the base 115' engage and interlock with the second plurality of fasteners 11' and 12' on the sheet 10. The engagement and interlocking of fasteners allows the tool 108' to grab the sheet 10. When the bar 110 is extended to protrude outside the housing unit 114', the first plurality of fasteners 11 and 12 of the bottom contact surface of the base 115' disengage and unlock from the second plurality of fasteners 11' and 12' of the sheet 10. The disengagement and unlocking of fasteners allows the tool 108' to release the sheet 10. In a variation of this embodiment, the base 115' has no fastener on its bottom contact surface; but the bar 110 has a first plurality of fasteners on at least some portion of its bottom contact surface. In operation, the tool 108' is positioned adjacent to the sheet 10 with fasteners 11' and 12'. When the bar 110 is extended from the housing unit 114' to expose its fasteners, the first plurality of fasteners of the bar 110 engage and interlock with the second plurality of fasteners 11' and 12' on the sheet 10. The engagement and interlocking of fasteners allows the tool 108' to grab the sheet 10. When the bar 110 is retracted to recess into the housing unit 114', the first plurality of fasteners of the bar 110 disengage and unlock from the second plurality of fasteners 11' and 12' of the sheet 10. The disengagement of the first and second plurality of fasteners allows the tool 108' to release the sheet 10.

Yet another embodiment of a fiber-sheet handling tool 108" according to the present invention is shown in FIG. 15C. Fiber-sheet handling tool 108" includes a base plate 115", a moving plate 113, and a connector 99". Both the base plate 115" and the moving plate 113 have at least one pin 112. The connector 99" is capable of being coupled to a control signal and/or a manual, electrical, hydraulic, magnetic, and/or mechanical driving force. Pins 112 are capable to be fit into the gap between two sheets 10. The moving plate 113 can be raised or lowered by manual, electrical, hydraulic, magnetic, and/or mechanical driving force. In operation, the tool 108" is positioned adjacent to sheets 10 so that the pins 112 are configured to fit into the gap between two sheets. When the moving plate 113 is raised, the fasteners between sheets disengage and unlock from each other. The disengagement and unlocking allows the tool 108" to separate and grab the sheet 10. When the moving plate 113 is lowered, the fasteners between sheets engage and interlock with each other. The engagement and interlocking of fasteners allows the tool 108" to release the sheet 10.

Figure 16A:
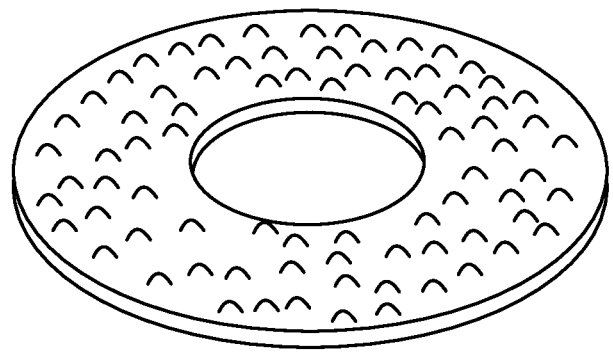
FIG. 16A illustrates a cutting wheel made of multiple fiber sheets.
Figure 16B:
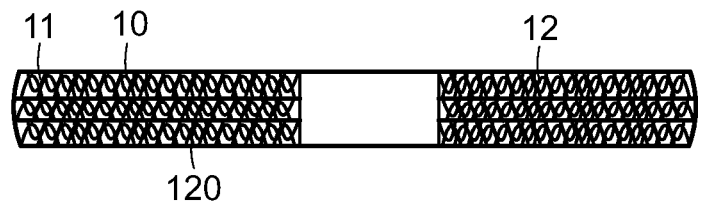
FIG. 16B shows a cross-section view of the cutting wheel of FIG. 16A.
Figure 20A:
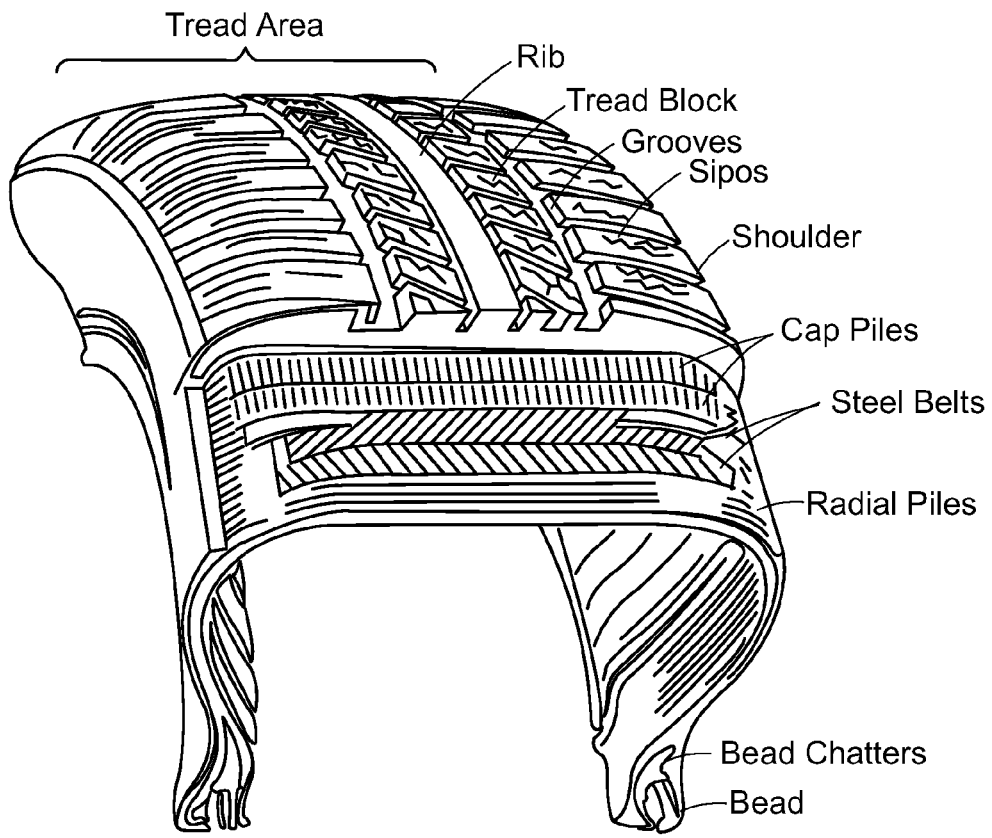
FIG. 20A illustrates an exemplary tire that can be at least partially made of fiber sheet with fasteners.
Figure 20B:
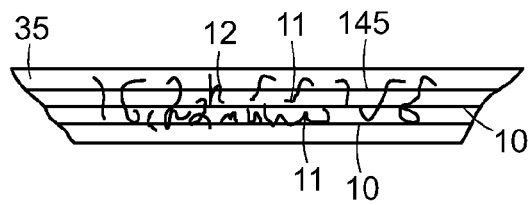
FIG. 20B shows a cross-section view of a portion of the tire of FIG. 20A.

The 3-Dimension fiber structures for composites and interfaces have wide range of applications. For one example, a cutting wheel can be at least partially made of 3-Dimension fiber structures. One embodiment of such a cutting wheel is shown in FIGS. 16A and 16B. In this embodiment, a plurality of sheets 10 with fasteners 11 and 12 are interlocked together, providing the cutting wheel with enhanced laminate strength. In addition, the exposed fasteners 11 and 12 on the outermost sheets can help to withhold and suppress particles 120 (e.g., sawdust) generated during the cutting process, increasing the usage life of the cutting wheel and associated equipments. The cutting wheel can be manufactured using conventional processes, with the exception that the individual layers are made of sheets with fasteners. For another example, a tire can be at least partially made of 3-Dimension fiber structures. One embodiment of such a tire is shown in FIGS. 20A and 20B. In this embodiment, a plurality of sheets 10 with fasteners 11 and 12 are interlocked together. The fasteners 11 and 12 on at least one sheet 10 can also penetrate, engage, and interlock with at leas one other layer 145 of the tire, such as a fabrics or a net. The engagement and interlocking can form strong 3-D reinforcements in tires, providing features such as longer usage life, higher puncture-resistance, and stronger interlaminate strength. Sheets 10 and other layers 145 of a tire can be made of various materials, such as Kevlar, carbon fiber, glass fiber, steel wire, or other fiber materials. Sheets 10 in tires can optionally have matrix material 35 incorporated/applied for bonding.

Figure 21:
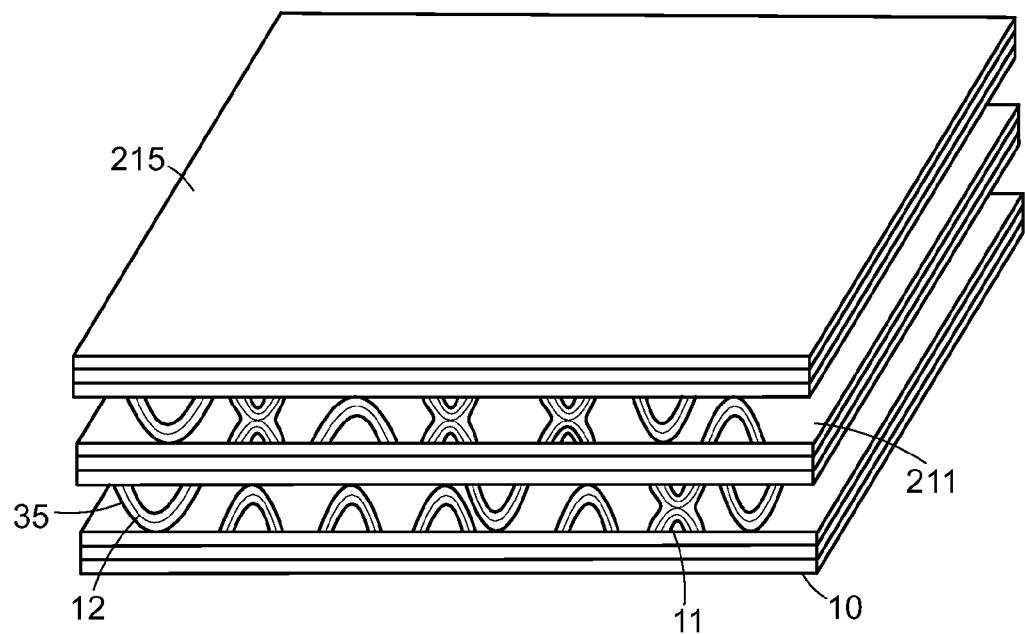
FIG. 21 illustrates an exemplary composite panel or block.

The 3-Dimension fiber structures for composites can also be used to manufacture structures with internal spaces. FIG. 21 illustrates an example of such a structure. Several sheets or substrates 10 are laid together layer-by layer to form a composite panel or block 215 with hollow spaces inside. The fasteners (e.g., hooks and loops) can be configured to engage each other to provide inter-layer connections and supports. The stack of substrates 10 is not fully compressed; and thus, there is hollow space 211 between the substrates 10. The fasteners 11 and 12 can act both as connectors/supports and as spacers between substrates 10 in a composite structure. The hollow space within the composite panel or block 215 helps to improve certain characteristics (e.g., thermal resistance) of the composite panel or block 215. Such panel composite panels or blocks can be used in the construction industry, such as to make walls and doors. Preferably, the top sheet and the bottom sheet have fasteners only on the inner side of the sheets. Optionally, the top sheet and the bottom sheet do not have fasteners at all. Composite panel 215 can be manufactured by using a stack of prepreg sheets or by infiltrating the 3D stack of sheet 10 preform with resin.

Figure 17A:
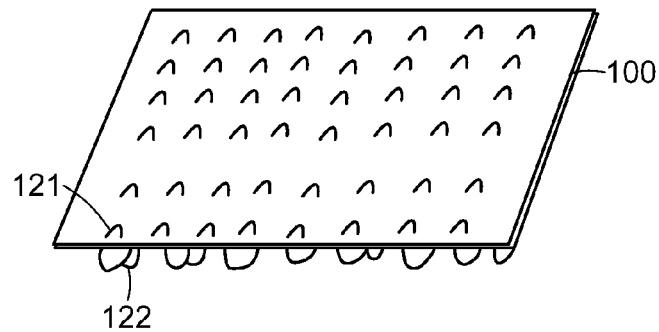
FIG. 17A illustrates an exemplary sheet with fasteners of different length and stiffness on two sides.
Figure 17B:
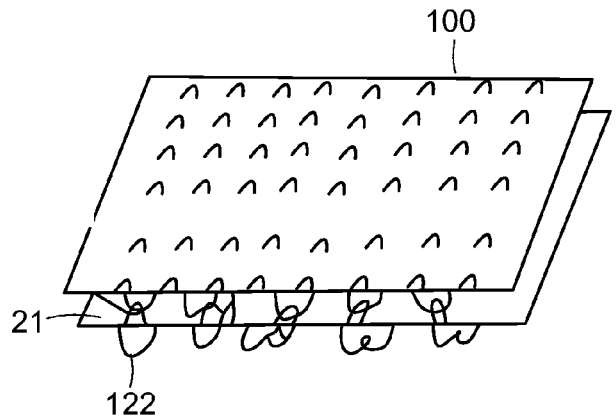
FIG. 17B illustrates two sheets of FIG. 17A interlocked together by fasteners of different length and stiffness.
Figure 17C:
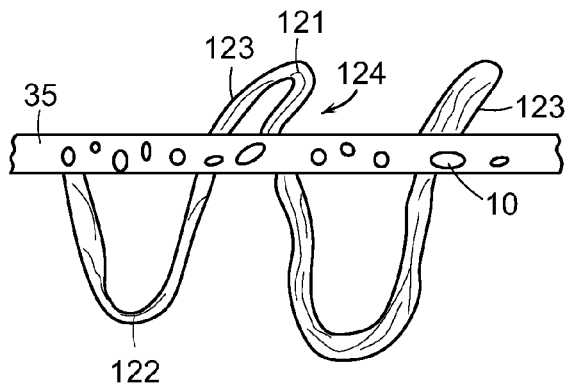
FIG. 17C shows a close-up cross-section view of the sheet of FIG. 17A.
Figure 19A:
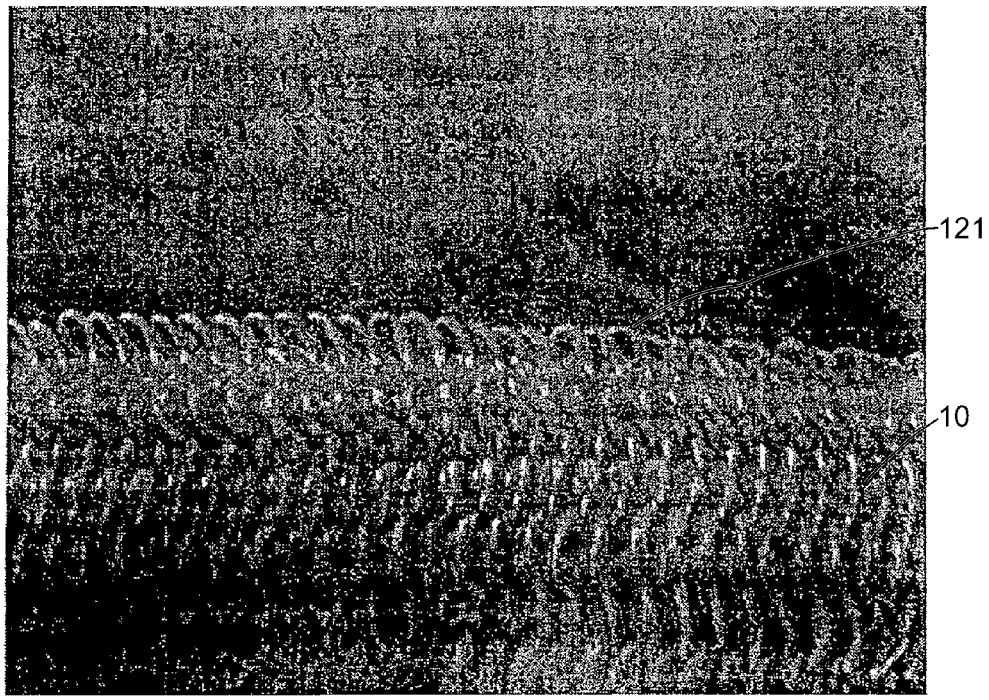
FIG. 19A and FIG. 19B are photos of a prototype showing fasteners with acute angle engaged and interlocked.
Figure 19B:
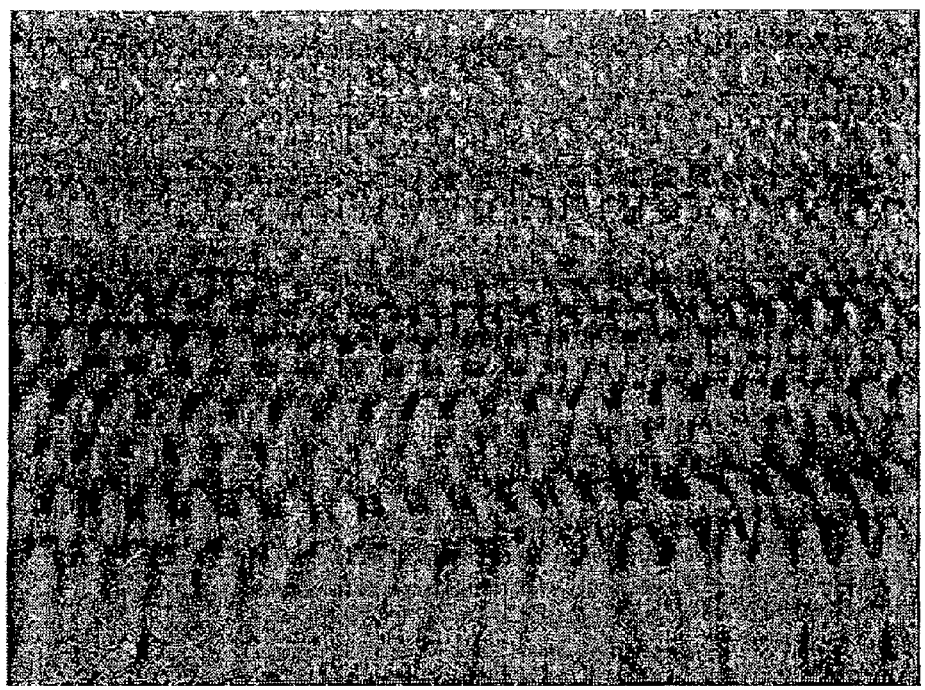

The fasteners on two sides of a sheet are not necessarily of the same length or same stiffness. FIG. 17A illustrates an exemplary sheet 100 with shorter and stiffer fasteners 121 on one side and longer and softer fasteners 122 on the other side. Fibers such as fiberglass and carbon fiber have different bending modulus. A shorter fastener is generally stiffer and harder against bending and buckling under a particular compression load. When shorter and stiffer fasteners 121 are pressed against longer and softer fasteners 122, the shorter and stiffer fasteners 121 will normally engage and interlock with the longer and softer fasteners 122, as shown in FIG. 17B. The shorter and stiffer fasteners 121 on a sheet plane 10 can achieve an acute angle 124 leaning towards a desired direction by optimizing weaving and knitting technologies for making Velcro fasteners, towels, etc. Fasteners leaning with acute angle 124 can also be obtained by applying coating and sizing materials 123 at the desired location and direction on the fasteners in order to sharpen the leaning fasteners. Fasteners leaning with acute angle help to engage other fasteners on an adjacent sheet. FIGS. 19A and 19B are two photos of a prototype, showing fasteners with acute angle engaged and interlocked with each other.

Figure 18A:
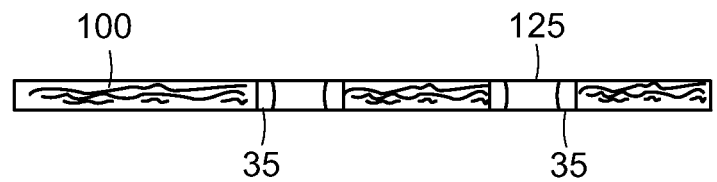
FIG. 18A shows a cross-section view of an exemplary sheet with openings.
Figure 18B:
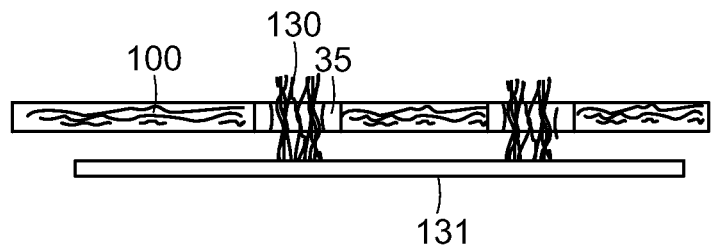
FIG. 18B shows a cross-section view of the sheet of FIG. 18A coupled with a stopping plate or film.

Referring now to FIGS. 18A and 18B, another exemplary process of generating fasteners on a sheet is illustrated. FIG. 18A shows a cross-section view of an exemplary sheet 100 with at least one opening 35. At first, matrix material 35 is applied to the inner walls of openings 35. Then, flocking technologies, either via electrical field or mechanical means, is used to run fasteners 130 through openings 35 on sheet 100.

Optionally, fasteners 130 can be aligned by a plate or a film 131 to achieve a desired height/length above the surface of sheet 100.

The detailed descriptions above in connect with the corresponding figures are intended to illustrate the present invention, and are not intended to represent the only forms in which the present invention may be constructed and/or utilized. The descriptions set forth the structure and the sequence of steps for practicing the present invention in connection. It is to be understood, however, that the same or equivalent structures and steps may be accomplished by different embodiments that are also intended to be encompassed within the spirit and scope of the invention. Accordingly, it is not intended that the invention be limited except by the claims.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

What is claimed is:

1. A tool for handling a sheet, comprising:
a base;
a connector coupled to a driving force;
a housing unit in the base;
a moving element, positioned at least partially within and coupled to the housing unit and coupled to the driving force; and
a first plurality of fasteners disposed on at least a portion of a surface of the moving element to engage and interlock a second plurality of fasteners disposed on the sheet;
wherein a change in position of the moving element disengages and unlocks the first plurality of fasteners from the second plurality of fasteners;
wherein after disengagement and unlocking of the first plurality of fasteners from the second plurality of fasteners, the first plurality of fasteners remain disposed on the surface of the moving element, and the moving element remains coupled to the housing unit.

2. The tool in claim 1, wherein the first plurality of fasteners can hide in the housing unit and be lower than an edge of said housing unit in the base in order to disengage, unlock, and thereby release the sheet from the plurality of fasteners, and said first plurality of fasteners can also can be exposed from the housing unit and extended beyond the edge of said housing unit to engage, interlock, and thereby grab the sheet.

3. The tool in claim 1, wherein the moving element can extend from the housing unit and extend beyond an edge of said housing unit to expose the first plurality of fasteners in order to engage, interlock, and grab the sheet, and wherein the moving element can retract to recess into the housing unit and be lower than the edge of said housing unit in order to disengage, unlock, and release the sheet.

4. The tool as recited in claim 1, wherein the first plurality of fasteners on the housing unit can be lower than an edge of the moving element in order to disengage, unlock, and thereby release the sheet from the first plurality of fasteners, and said first plurality of fasteners can also can be exposed and extended beyond the edge of the moving element to engage, interlock, and thereby grab the sheet.

5. A sheet-handling tool to grab and release a sheet material, the tool comprising:
a base having a bottom contact surface;
at least one moving element coupled to the base, wherein the at least one moving element has a surface, and the moving element moves either rotatably or retractably relative to the base between a position A and a position B;

a first plurality of fasteners disposed on only one of said bottom contact surface and a portion of said surface of the moving element;

wherein when the tool is placed on the sheet material and when the moving element is in the position A, the first plurality of fasteners engage and interlock the sheet material;

wherein when the moving element moves from the position A to the position B, a change in positions of the base and the moving element makes the first plurality of fasteners no longer available to engage and interlock the sheet material; and wherein after disengagement and unlocking of the first plurality of fasteners from the sheet material, the first plurality of fasteners remain disposed on one of said bottom contact surface and said portion of said surface of the moving element.

6. The tool as recited in claim 5, wherein the moving element moves rotatably relative to the base between the position A and the position B.

7. The tool as recited in claim 6, wherein the first plurality of fasteners are disposed on the portion of said surface of the moving element, and the moving element has other surface area that does not have the first plurality of fasteners disposed.

8. The tool as recited in claim 7, wherein when the moving element rotates from the position A to the position B, the portion of said surface of the moving element moves from being exposed to being hidden, thereby making said first plurality of fasteners from being available to being unavailable to engage and interlock with the sheet material.

9. The tool as recited in claim 8, wherein the sheet material is a fiber sheet.

10. The tool as recited in claim 9, wherein the moving element is a rod.

11. The tool as recited in claim 9, wherein the fiber sheet also has a second plurality of fasteners disposed on its top surface to engage and interlock said first plurality of fasteners.

12. The tool as recited in claim 5 wherein the moving element moves retractably relative to the base between the position A and the position B.

13. A tool to selectively grab and release a fiber sheet, the tool comprising:

a base having a bottom contact surface;

at least one moving element coupled to the base and moves from a position A to a position B, relative to the base, wherein the moving element has a surface;

a first plurality of fasteners disposed either on the bottom contact surface or on a portion of the surface of the moving element, wherein the first plurality of fasteners engage and interlock with a second plurality of fasteners disposed on the fiber sheet;

when the tool is placed on top of the fiber sheet and physically touches the fiber sheet, and when the moving element is in the position A, the first plurality of fasteners make physical contact with the second plurality of fasteners, thereby engaging, interlocking, and grabbing the fiber sheet;

when the first plurality of fasteners and the second plurality of fasteners are engaged and interlocked, the moving element disengages the first plurality of fasteners from the second plurality of fasteners by moving to the position B, which causes said portion of the surface of the moving element and the bottom contact surface to misalign; and wherein after disengagement and unlocking of the first plurality of fasteners from the second plurality of fasteners, the first plurality of fasteners remain disposed either on the bottom contact surface or on said portion of the surface of the moving element.

14. The tool as recited in claim 13, wherein the moving element moves from the position A to the position B by an act of retracting and protruding, relative to the base.

15. The tool as recited in claim 14, wherein to misalign means not being on a same plane.

16. The tool as recited in claim 15, wherein the first plurality of fasteners is disposed on said portion of the surface of the moving element.

17. The tool as recited in claim 15, wherein the first plurality of fasteners is disposed on the bottom contact surface.

18. The tool as recited in claim 13, wherein the moving element moves from the position A to the position B by an act of rotating, relative to the base, and wherein the first plurality of fasteners are disposed on said portion of the surface of the moving element.

19. The tool as recited in claim 18, wherein in the position A, said portion of the surface of the moving element is generally facing downward, towards the fiber sheet, and wherein in the position B, said portion of the surface of the moving element is generally facing away from a directly downward facing direction.

20. The tool as recited in claim 19, wherein to misalign means said portion of the surface of the moving element and the bottom contact surface can no longer physically touch the fiber sheet simultaneously.

21. The tool as recited in claim 20, wherein the moving element is driven by one of manual, electrical, hydraulic, air, magnetic, and mechanical driving force.

* * * * *